Figure 1:
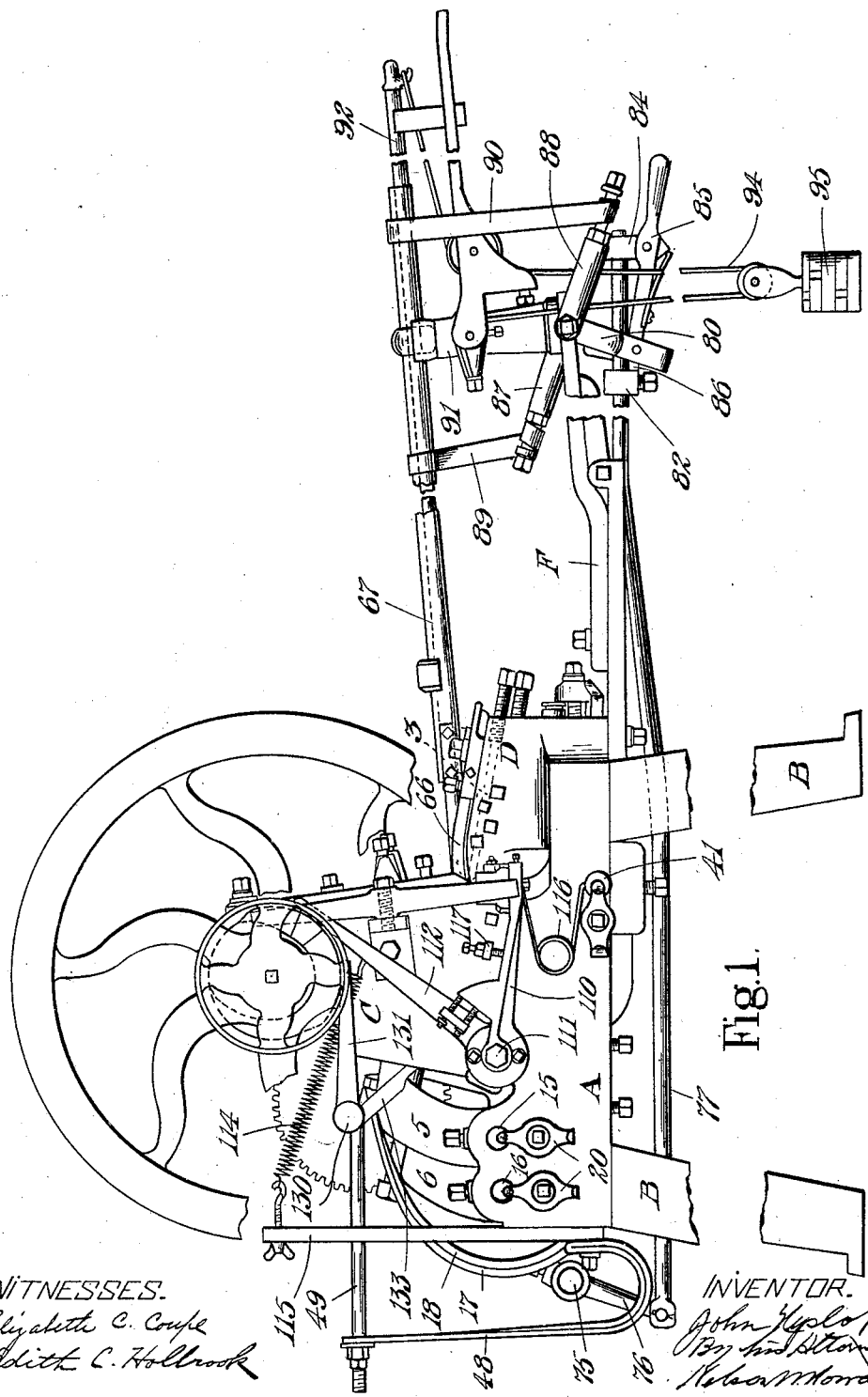

J. HYSLOP.
NAIL MAKING MACHINE.
APPLICATION FILED APR. 13, 1908.

1,072,465.

Patented Sept. 9, 1913.
5 SHEETS—SHEET 1.

WITNESSES.
Elizabeth C. Coupe
Edith C. Holbrook

INVENTOR.
John Hyslop
By his Attorney
Nelson M Howard

COLUMBIA PLANOGRAPH CO., WASHINGTON, D. C.

J. HYSLOP.
NAIL MAKING MACHINE.
APPLICATION FILED APR. 13, 1908.

1,072,465.

Patented Sept. 9, 1913.
5 SHEETS—SHEET 3.

WITNESSES
Elizabeth C. Coupe
Edith C. Holbrook

INVENTOR
John Hyslop
By his Attorney,
Nelson W. Howard

J. HYSLOP.
NAIL MAKING MACHINE.
APPLICATION FILED APR. 13, 1908.

1,072,465.

Patented Sept. 9, 1913.
5 SHEETS—SHEET 4.

WITNESSES.
Elizabeth C. Cripe
Edith C. Holbrook

INVENTOR.
John Hyslop
By his Attorney
Nelson M Conrad

J. HYSLOP.
NAIL MAKING MACHINE.
APPLICATION FILED APR. 13, 1908.
1,072,465.
Patented Sept. 9, 1913.
5 SHEETS—SHEET 5.
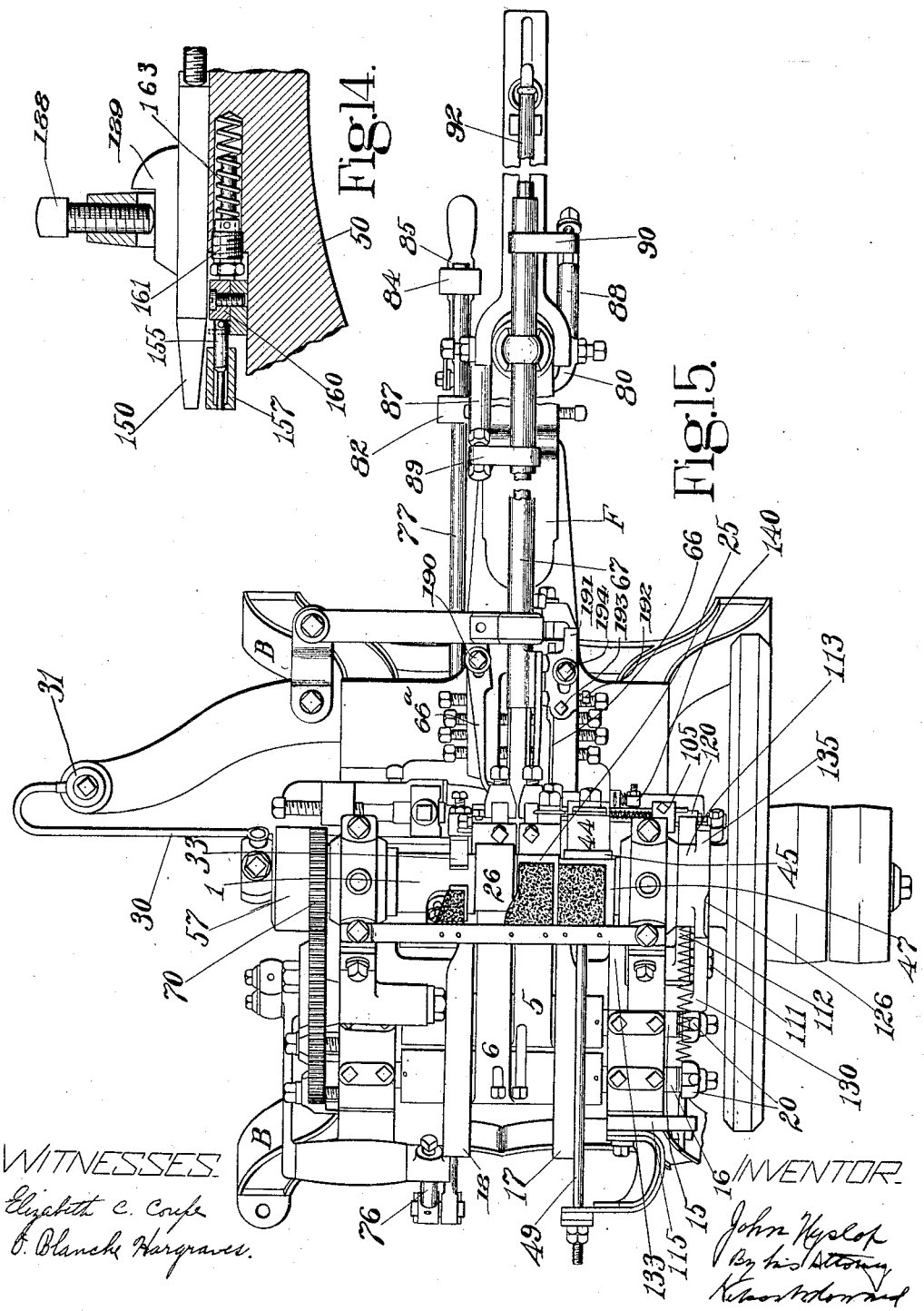

UNITED STATES PATENT OFFICE.

JOHN HYSLOP, OF ABINGTON, MASSACHUSETTS, ASSIGNOR TO UNITED SHOE MACHINERY COMPANY, OF PATERSON, NEW JERSEY, A CORPORATION OF NEW JERSEY.

NAIL-MAKING MACHINE.

1,072,465.          Specification of Letters Patent.          Patented Sept. 9, 1913.

Application filed April 13, 1908. Serial No. 426,763.

*To all whom it may concern:*

Be it known that I, JOHN HYSLOP, a citizen of the United States, residing at Abington, in the county of Plymouth and Commonwealth of Massachusetts, have invented certain Improvements in Nail-Making Machines, of which the following description, in connection with the accompanying drawings, is a specification, like reference characters on the drawings indicating like parts in the several figures.

This invention relates to nail making machines and its object is to improve machines of this class.

In order to secure uniformity in headed nails, it is customary to form the heads somewhat larger than required, and then to trim or shear or otherwise bring the heads to a uniform shape and size. Heretofore this process necessitated the use of two machines. The first usually cut nail blanks from an appropriate strip of metal, and shaped the shank and formed a head on one end of the blank. The nails were then transferred by hand to the second machine, which trimmed the heads to the desired shape and size.

It is an object of this invention to provide one machine which shall be capable of producing finished nails and which shall combine the operations of the two machines heretofore used.

It is also an object to provide a nail making machine wherein the cutting, forming, heading, finishing and the various carrying operations incident thereto are performed automatically.

It is a further object to perform all these operations in the same time and with approximately the same amount of space and power as was required to operate the nail forming and heading machine, and thus to make a finished nail in the same time and with the same power and space as were formerly required for the production of an unfinished nail.

In the preferred form of the invention herein shown, automatic mechanism is provided to feed into the machine a strip of metal, to cut an appropriate nail blank therefrom, to carry said blank to a forming die, to shape the shank and to swage a head upon the desired end of the blank, to grasp and carry the nail so shaped and headed to a trimming or finishing die, to reduce the head of the nail to the desired shape and size, and then to grasp the nail so finished and carry it out of the way of the mechanism and deposit it in a chute or box.

Other features of the invention and details of construction will be pointed out in the specification and in the claims.

A preferred form of the invention is illustrated in the accompanying drawings in which :—

Figure 2:
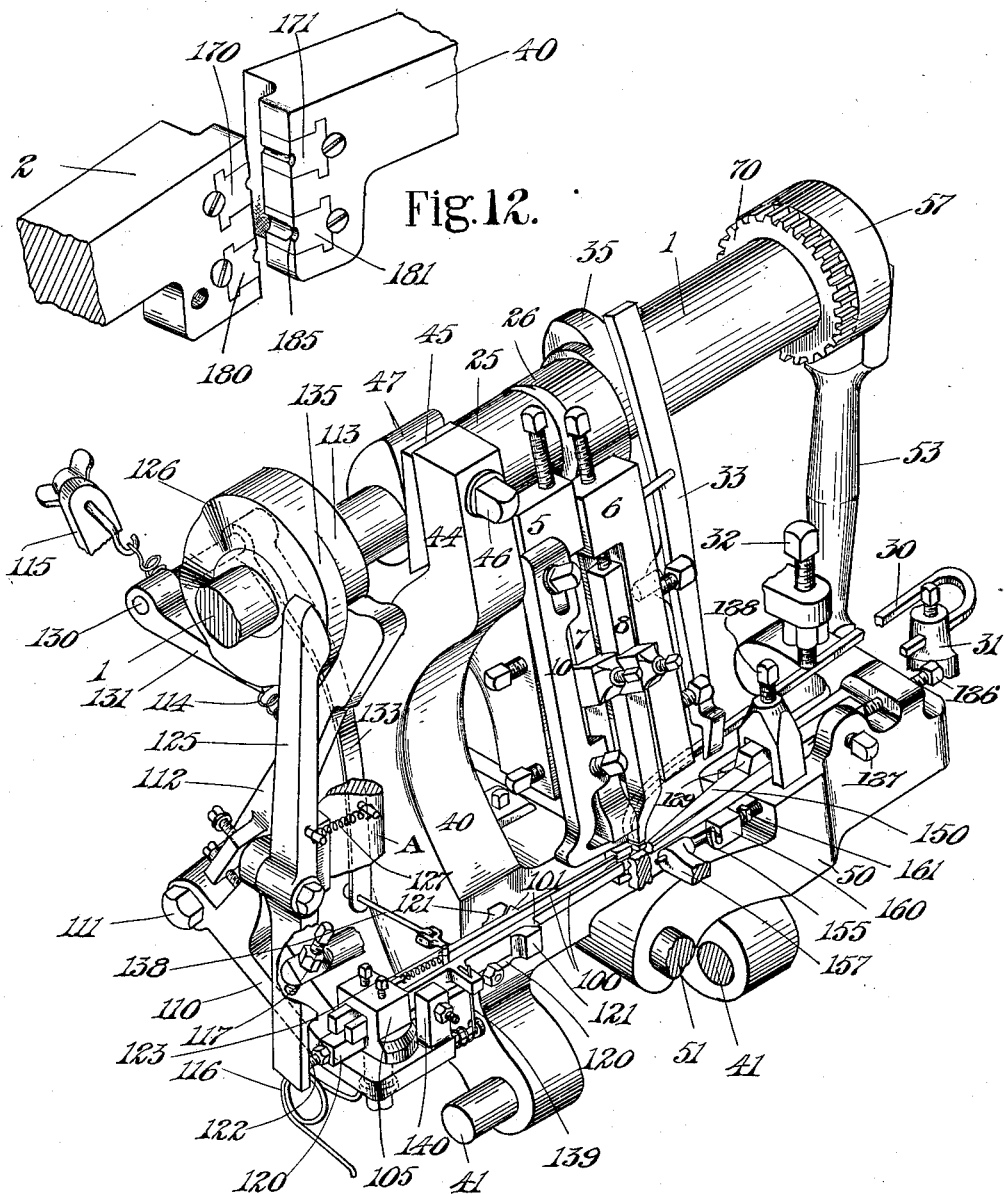
Figure 3:
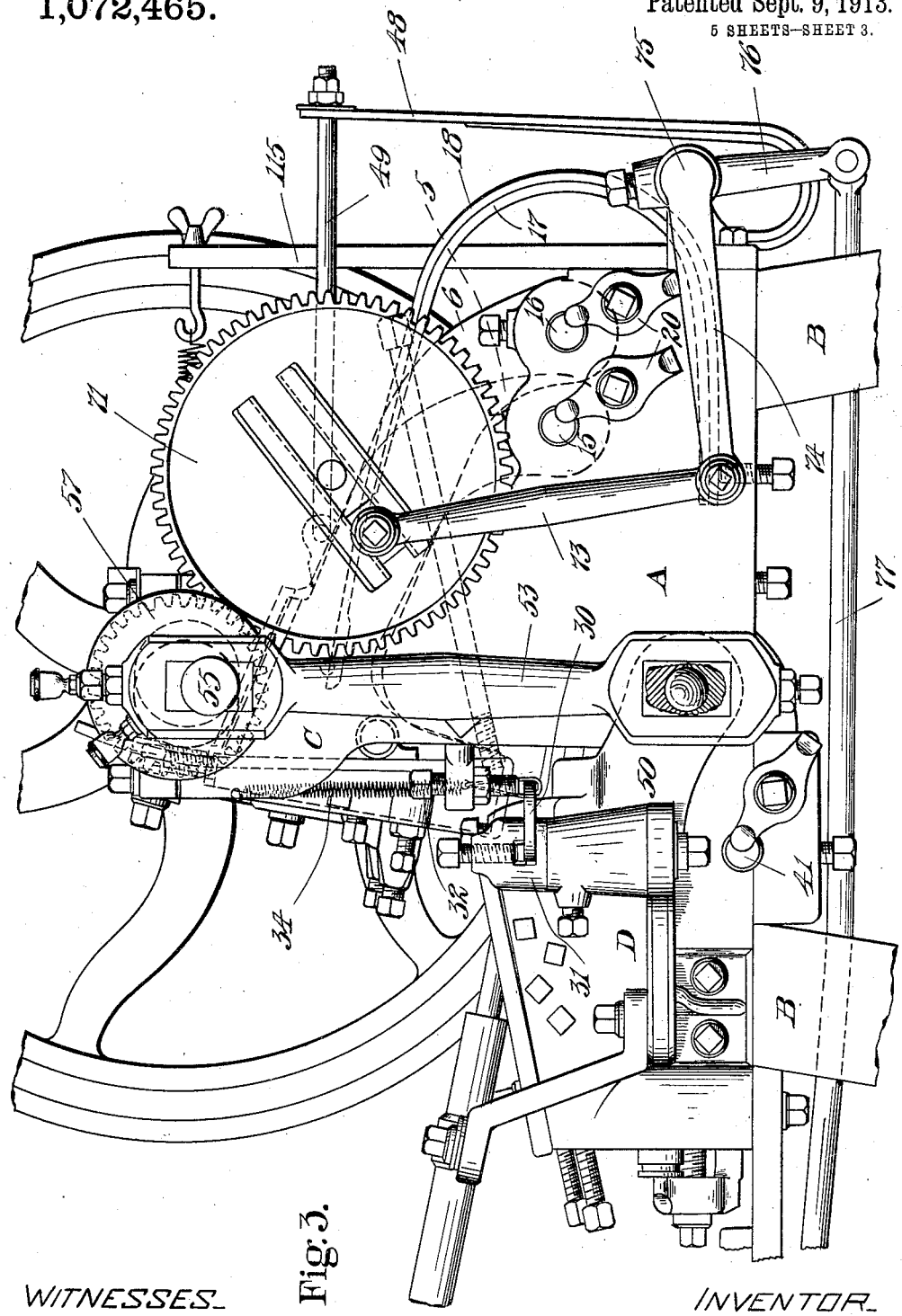
Figure 5:
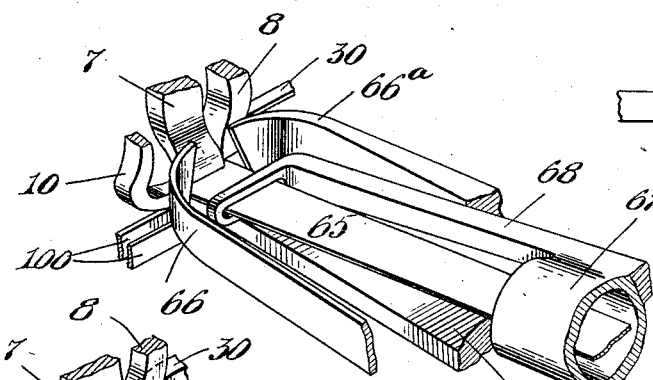
Figure 13:
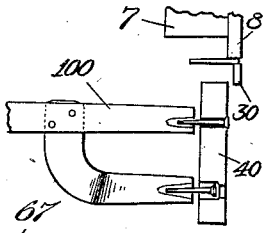
Figure 6:
Figure 4:
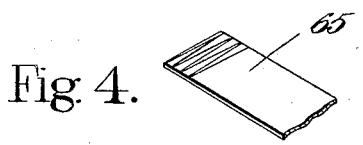
Figure 7:
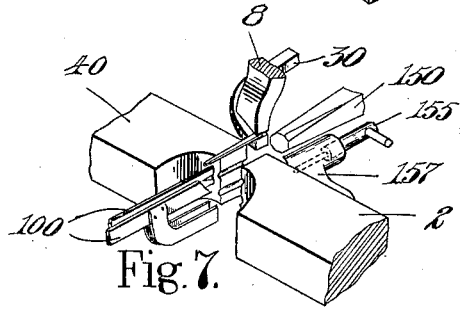
Figure 8:
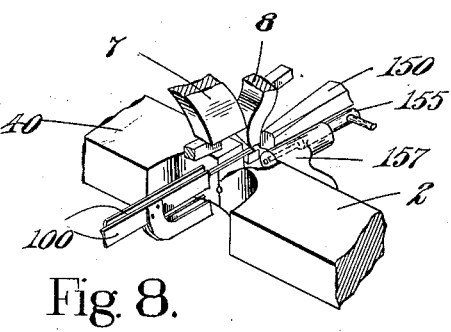
Figure 10:
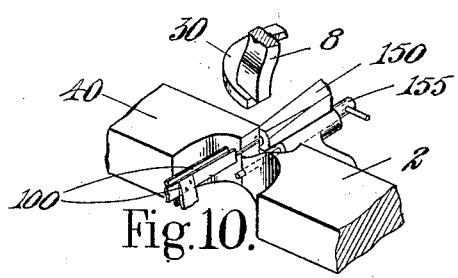
Figure 9:
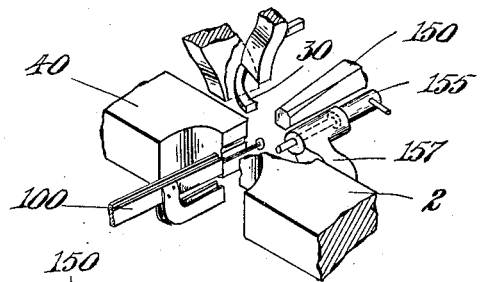
Figure 11:
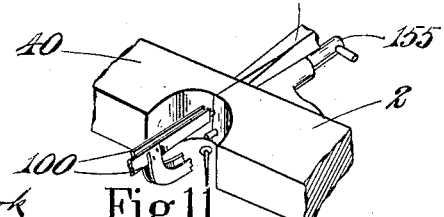

Figure 1 is a side view of a nail making machine wherein the invention is embodied. Fig. 2 is a perspective view showing the main working parts of the mechanism with the frame omitted to obtain a clearer view. Fig. 3 is an enlarged view of the side of the machine opposite to that shown in Fig. 1. Fig. 4 is an enlarged view of a portion of the metal strip used in forming nail blanks, showing in outline successive tapered nail blanks to be cut therefrom. Fig. 5 is an enlarged view of a portion of the metal strip, its holder and guides, and the upper cutting devices. Fig. 6 is a further enlarged detail of the cutting devices showing a tapered nail blank about to be cut. Fig. 7 is an enlarged detail of a portion of the die blocks and header, showing the nail blank immediately after being severed from the metal strip and in the control of the first carriers while on the way to the first or forming die. Fig. 8 is an enlarged view showing the blank in the forming die ready for the heading operation and the carrying fingers about to grasp said blank. Fig. 9 is an enlarged detail with a portion of the stationary or bed die omitted, showing the headed nail in the control of the carrying fingers as it is being carried from the forming to the trimming die. Fig. 10 is an enlarged detail with a portion of the bed die omitted, showing the simultaneous operation of the header and the trimming punch upon a nail blank and a nail in the forming and trimming dies, respectively. Fig. 11 shows the nail blank and nails after the completion of the carrying operation, the finished nail having been carried out of the way of the mechanism dropped, and the blank having been carried to the forming die and the headed nail to the finishing die for the heading and trimming operations respectively. Fig. 12 is an enlarged detail showing the sectional dies. Fig. 13 is an enlarged detail showing a portion of the carrying devices approximately at the commencement of the carrying operation. Fig. 14 is an enlarged view of the trimming punch and a portion of the means for actuating it shown in cross section. Fig. 15 is a plan view of the machine.

The letter A designates a suitable frame which is supported by standards B, and said frame is formed with a forward section D and also with two upwardly extending portions C in which are bearings for the main shaft 1.

In the machine herein illustrated a metal strip 65 is automatically fed into the cutting devices as will be hereafter described and a nail blank is cut therefrom. A lower cutting tool 3 is adjustably secured in the forward section D. The upper and movable cutting devices comprise two rocking blocks 5 and 6 pivotally mounted upon studs 15 and 16 which are journaled in the rear of the frame. Clamping devices 20 provide for lateral adjustment of blocks 5 and 6. Springs 17 and 18, secured to the rear of the frame A, act to hold the blocks 5 and 6 upwardly with the upper portions of said blocks against the cams 25 and 26 respectively, in the position shown in Fig. 2. Adjustably secured at the front of blocks 5 and 6 are the upper cutting tools 7 and 8. A member 10 is also adjustably secured to the front face of the block 5 and extends below the cutting edge of the tool 7 and there serves as a stop for the metal strip 65 to contact against in its forward feeding movement. The said member 10 is a means to determine the width of a nail blank to be cut from the strip 65.

The cams 25 and 26 are formed to move the blocks 5 and 6 in unison, with the cutting edges of the tools 7 and 8 in the same horizontal line, during the cutting operation, and after the cutting operation, the cam 26 continues to move the block 6 and tool 8 farther downwardly as will be described. The bearer 30 is arranged to coöperate with the tool 8 to form the first carrying mechanism and is adjustably mounted at 31 upon an extension of the frame A. A contractile spring 34 holds the bearer 30 upwardly against an adjustable stop 32. One end of this bearer contacts with the lower side of the nail blank as it is cut from the strip and this end of said bearer is carried downward by the downward action of the tool 8 (see Figs. 7 and 8) acting upon the upper side of the severed nail blank. A lever 33, pivoted to the frame and constructed to be actuated by a cam 35 on the main shaft, is arranged to move laterally that end of the bearer 30 which has been in contact with the nail blank, so that it will not interfere with the action of the header.

In the preferred embodiment of this invention as herein shown, divided and sectional dies are used, as will be described, the forward section D containing a die block with one half of the forming and trimming dies and the other half of the dies being mounted in a movable block 40. The block 40 is pivotally attached to the frame A by studs 41, 41 set in bearings formed therefor and said block has an upwardly extending arm 44 arranged to be actuated by a cam 47 on the main shaft 1. The arm 44 is held in contact with the cam 47 by means of a spring 48 which is secured to the rear portion of the frame A and is connected to the arm 44 by the rod 49. A wedge-shaped bearing block 45 is adjustably secured to the arm 44 by a screw 46 and permits the time of action of the cam 47 upon said arm to be varied.

The header and the trimming punch, which act upon nail blanks in the forming and trimming dies respectively, are adjustably secured upon a lever 50 which is pivotally mounted upon studs 51 set in bearings in opposite sides of the frame. A link 53 connected to an arm on the lever 50 and to a crank pin 55 on the pulley 57, as shown in Fig. 3, are provided to actuate the lever 50. The header 150 is of usual construction and is adjustably held upon the lever 50, in a position to coöperate with the forming die and form a head upon the nail blank during the upward movement of said lever 50. The header 150 is held in position on the lever by the set screws 186, 187 and 188. The screws 186 and 187 bear respectively upon the end and the side of the header, and the screw 188 forces the extended bearing block 189 upon the header from above. It will be evident that with this construction the header may be adjusted both sidewise and endwise to place it in the desired position to coöperate effectively with the die, and the set screws serve to hold it rigidly in place.

The metal strip 65 from which successive nail blanks are automatically cut is of a width equal to the length of nail blank desired and is fed to the cutting devices between adjustable guides 66, 66ª. A holder 67, having an extension 68 formed to engage the strip 65, is rotatably supported in the front of the machine by means of a bracket F affixed to the section D or otherwise. In forming tapered nails it is desirable to turn the metal strip 65 through one half a revolution upon its longitudinal axis after a tapered blank is cut therefrom in order to utilize the bevel left on the end of the strip as a taper in reverse position for the next blank. Reference to Fig. 4 further illustrates the necessity of so turning the strip to position the widest end of the blank for the action of the header. To revolve the strip 65, mechanism is provided to impart to the holder 67 two alternate semi-revolutions with two successive complete revolutions of the main shaft. This mechanism comprises a gear 70 on the main shaft meshing with a gear 71 journaled in the rear of the frame A and having twice the number of teeth of the former gear. A rock shaft 75 is journaled in the rear of the frame A and has arms 74 and 76. The arm 74 is pivotally connected to the link 73 which is pivoted to an adjustable pin on the side of the gear wheel 71 as shown in Fig. 3. Said rock shaft is thus oscillated twice with each revolution of the gear wheel 71. To the arm 76 is pivoted one end of the rod 77, the outer end of said rod extending forward as shown in Fig. 1, resting across a U-shaped vibrator 80. This vibrator is so secured to the bracket F that it may oscillate, and the rod 77 is adjustably held on said vibrator 80 by collars 82 and 84 and devices 85 and 86. The vibrator 80 has rigid arms 87 and 88 and flexible straps 89 and 90 which connect said arms respectively with pins in the holder 67. These straps are wound upon the holder from opposite directions and are similarly attached to the vibrator whereby the oscillation of the vibrator 80, imparted to it by the rod 77, turns the holder 67 through 180° in alternate direction by winding up one strap while releasing the other. Said holder is rotatably held by any suitable means as by a species of ball and socket connection upon the post 91 near the end of the bracket F. The metal strip 65 is fed forward by a follower 92 which is of appropriate size to permit it to enter the holder 67. The follower is actuated by the weight 95 and line 94 in a manner common in the art.

The guide 66ª is formed with a slot through which passes a clamping screw 190 to hold the guide rigidly in position upon the upper face of the part D of the frame. This guide, it will be noted, is upon the side of the machine adjacent to the heading punch, and its function is to determine the position of the metal strip 65 with reference to the face of the die so as to insure that a proper extent of the nail blank shall project from the die to be subjected to the action of the header. By loosening the screw 190 the guide may be adjusted for the purpose of varying the extent of the blank to be used in forming the nail head. The guide 66, on the opposite side, is in the form of a spring arm, and its function is to bear constantly upon the metal strip in all positions of the latter so as to force it into engagement with the guide 66ª. The guide 66 is mounted in a holder 191 and held therein by the set screw 192. The holder 191 is formed with a slot similar to the slot in the guide 66ª and is adjustable in a similar manner and held in adjusted position by the clamping screw 194. A screw 193 is threaded through the holder and bears upon the upper face of the part D of the frame so as to adjust the elevation of the guide arm 66.

The forming and trimming or finishing dies are somewhat shorter than the length of a nail blank to be operated upon, and a sufficient portion of the nail blank is left projecting to the left of the dies, as seen in Fig. 8, so that fingers 100 can grasp the portion so projecting. Scores or notches in the ends of the fingers facilitate their holding the nail blank. These fingers have duplicate ends (see Fig. 13) to grasp the blank while it is in the trimming die and carry it to a chute. The fingers 100 are adjustably secured in a block 105, which block is pivoted upon the end of one arm 110 of a bell crank lever pivoted to the frame A by a bolt 111 and the other arm 112 is positioned to be actuated by a cam 113 on the main shaft 1. One end of a contractile spring 114 is attached to the arm 112 and the other end is adjustably attached to a post 115 and acts to hold said arm 112 in contact with the cam 113. Also the spring 116 acting upwardly on the arm 110 coöperates with the spring 114 in its action. A stop 117 limits the upward movement of the arm 110. Provision is made for adjustment of the angle formed between the arms 110 and 112 of this bell crank lever, as shown in Fig. 1. Upon the outside of the fingers 100 are formed small lugs 101 having beveled faces arranged to be engaged by correspondingly beveled faces upon projections 121 on the slide 120. The slide 120 is also supported by the block 105 and is longitudinally actuated by the lower portion of a lever 125 pivoted to the frame A. The upper portion of said lever is in contact with the face cam 126 on the main shaft. An adjustable contact piece 122 is threaded into the slide 120 with its outer end in contact with the lever 125, which lever extends below said contact piece sufficiently so that it will still be in engagement therewith during the vertical movement of the block 105 caused by the rocking of the arm 110. The spring 127 acts to hold the upper part of the lever 125 in contact with its cam 126, and the spring 123 from the block 105 to a pin in the slide 120 (see Fig. 2) acts to hold said slide and its contact piece 122 against the lower portion of said lever 125. The action of the cam 126 forces the slide 120 forwardly, thus causing the projections 121 to slide upon the lugs 101 and thereby closing the ends of the fingers 100 adjacent to the dies. If a portion of a nail blank projects from the dies, the fingers will thus grasp and hold it. After this action and the die is opened, it is preferred to give a slight lateral movement to the fingers 100 to more readily remove a nail from the stationary half of the die and to thus facilitate lowering it to the next or trimming die, and similarly from the trimming die to the chute or box. To effect this movement, a rock shaft 130 journaled in the rear of the frame A is arranged with one arm 131 in contact with the cam 135 and the other arm 133 connected to the fingers 100 and slide 120 by a rod 138 which is equipped with a universal joint. A spring 139 is coiled to act in a contrary direction to said cam 135. A stop 140, rigid with the arm 110, prevents the fingers 100 from swinging too far outwardly. The said stop 140 may have an adjustable screw bearing against the fingers 100 limiting their outward movement to any desired position.

The trimming punch 155 is slidingly held in a punch block 157 attached to the bed die 2. As shown by the dotted lines in Fig. 9, this punch is preferably formed with one portion of smaller diameter and which may be of the size and shape desired to trim the nail heads, being herein shown as round. A block 160 is mounted in a slideway provided therefor as shown in Fig. 14 upon the lever 50 and one end of the trimming punch is constructed to engage said block by a loose bayonet joint. This connection permits the punch 155 to slide in the fixed punch block 157 and to be actuated to and fro in said block by the rocking movement of the lever 50. A spring normally holds the sliding block 160 forwardly, preferably acting upon a headed stem 163 which is arranged to slide through the adjustable screw 161, and thus during the upward movement of the heading lever, the punch is at first brought yieldingly in contact with the nail head to be trimmed when a nail is positioned in the trimming die.

During a considerable portion of the upward movement of the lever 50, the punch 155 is stationary relatively with the nail to be trimmed, as the spring actuating the sliding block 160 is not of sufficient strength to actuate the punch to force the nail head through the trimming die. Thus during a portion of the upward stroke of the lever 50, said spring is compressed and the block 160 and the stem 163 are forced backwardly until the head of the stem 163 contacts with the adjustable screw 161. It will be readily noted that the position of the screw 161 in relation to the lever 50 determines the time in the movement of the lever when the punch block 160 will be operated to trim the head of the nail. The block 160 is then held rigid during the latter part of the upward movement of the lever 50 and as said block 160 abuts against the punch 155, the latter is moved forwardly and slides through its punch block 157 whereby the trimming punch forces the head of the nail through the trimming die, and trims the head. During the backward or downward movement of the lever 50 the block 160 is caused by its spring to slide relatively upon the lever 50 until reaching the forward limit of its slideway when it takes up the movement of lever 50 and by its bayonet joint connection with the punch 155 draws the punch backwardly through the punch block 157. This backward movement continues until the acting end of said punch is drawn within the face of the punch block 157 as shown by dotted lines in Fig. 8. Thus any surplus portion of the nail head which was removed by the trimming operation and which may have been left encircling or attached to the punch was positively removed by contact with the face of the punch block as said punch was drawn within the block.

In the preferred embodiment of the invention shown, sectional dies are utilized. Thus in the case of the forming die, the die blocks 2 and 40 have removable sections 170 and 171 respectively, arranged to fit in recesses in the faces of the blocks and held in place by set screws. Hence instead of changing the entire die when different sized or shaped nails are to be operated upon or when a die orifice is to be renewed, only the portions designated by 170 and 171 need to be removed and replaced. The same applies to the trimming die, the portions 180 and 181 being similarly constructed. The block 2 with the section 170 may be regarded as one half of a two part die the block 40 with the section 171 constituting the other half. Similarly the block 2 with the section 180 may be regarded as one-half of a die of which the block 40 and section 181 constitute the other half. The head forming die may be of any well-known type. The trimming die is preferably formed with a narrow orifice or throat 185 having a cutting edge and through this orifice the head of the nail is forced by the trimming punch as previously described.

The operation of the machine is as follows: A metal strip having its width sufficient for the length of a nail blank is placed in the holder and in contact with the stop 10, and the follower bearing against the outer end of the strip is arranged to be operated by the weight 95. The guides 66, 66ª are adjusted to provide for the appropriate length of the blank to be used up in the heading operation and the stop 10 is set to determine the width to be cut. If tapered nails are to be cut, then the holder is also adjusted laterally so that the metal strip is fed to the cutting devices at the desired angle. Various other adjustments may also be made to suit the size of nail blank to be handled, such as adjustments for length of stroke, position, and time of operation of the carrying mechanisms and the extent of their lateral movements. When the main shaft is started the cams 25 and 26 thereon act to depress the blocks 5 and 6 and thereby the cutting tools 7 and 8 are moved to sever a nail blank from the metal strip 65. By the longer operation of cam 26 upon the block 6 the tool 8 and the bearer 30 are further moved to carry a blank when severed down to the level of the first or forming die. The movable die block is thereupon rocked by the cam 47, thus closing the dies and gripping the nail blank in the nail forming die. The block 5 being released by its cam 25 is elevated by the action of spring 17. The block 6 is similarly elevated by its spring 18, thus lifting the tool 8. One end of bearer 30 is moved laterally by the lever 33 operated by the cam 35, so that the header can be operated without interference. The lever 50 is then rocked upward and the header 150 thereby moved to coöperate with the forming die to form or swage a head upon the blank. During the heading operation, the face cam 126 acting upon one end of the lever 125 rocks said lever upon its pivot and the lower portion of said lever forces the slide 120 forwardly and the projections 121 thereon act upon the beveled faces of lugs 101 on the fingers 100, causing the ends of the fingers 100 adjacent to that portion of the nail blank projecting from the die to be closed and grasp the nail blank. As the dies are opened the cam 135, acting on one arm of the rock shaft 130, causes the other arm 133 through the rod 138 to give to said fingers 100 a slight lateral motion sufficient to remove the nail blank from the bed die. The fingers 100 are next moved downwardly by the action of the cam 113 on the arm 112 which thereby moves the arm 110 and the block 105 so that the headed nail blank is carried downwardly opposite to the second or trimming die. During this carrying operation the fingers remain closed as the cam 126 continues its action on the lever 125 and the contact between the lower portion of the lever 125 and the slide 120 is maintained. As the blank is held opposite the trimming die the cam 135 releases its action and the oppositely acting spring 139 moves the fingers laterally toward the bed die, the movable die thereafter closing upon the blank. The cam 126 then releases the lever 125 and the slide 120, and said slide is retracted by the spring 123, and the fingers 100 spring open by their own action, and are normally held apart by their position in the block 105 as shown in Fig. 2. While thus separated the fingers are returned to uppermost position by the action of the springs 114 and 116 as the arm 112 is released by the cam 113 and consequently the arm 110 carrying the block 105 is raised until in contact with the stop 117. The duplicate set of fingers to grasp the finished nail and carry it downward to a chute or box are attached to the forward portions of the fingers 100 and are substantially a part thereof and hence are similarly moved. Or the fingers 100 may be of sufficient width to grasp both the headed and finished nails. In following one blank thus far through the cycle of the machine it should be noted that the construction and time of operation is such that the metal strip has been given a half revolution and a second blank cut therefrom and that the tool 8 and bearer 30 were carrying a second blank to the forming die, while the fingers 100 were carrying the headed nail to the trimming die. After the second cycle of operations there are three nails " in process " in the machine, and while the tool 8 and bearer 30 are carrying a third blank to the forming die, the fingers 100 are carrying the second headed nail to the trimming die and also the first nail now finished is carried from the trimming die out of the way of the mechanism to a chute or box. The three carrying operations are performed at the same time while the dies are open, and the heading and trimming operations are performed at the same time and by the same movement of the lever 50 while the dies are closed. A completed nail is thus delivered at each revolution of the main shaft after the completion of the first nail.

The mechanism to revolve the metal strip automatically through 180° has been described and its operation is well known in the art and does not require to be specifically followed. It is adjustable in time and action to conform appropriately to the operations of the other mechanisms.

Having described my invention, what I claim as new and desire to secure by Letters Patent of the United States is:—

1. In a nail making machine, the combination with means for forming a nail from a nail blank, comprising a two part die and a heading punch, of means for finishing the nail so formed, arranged in predetermined relation to said forming means and comprising also a two part die, and means for grasping the shank of the nail formed in said first mentioned means and presenting said nail in predetermined relation to said finishing means.

2. In a nail making machine, the combination with means for forming a head upon a nail blank and for shaping the shank of the nail adjacent to the head, comprising a two part die and a heading punch, of means for finishing the nail head arranged in predetermined relation to said forming means, and means for grasping a portion of the shank that has not been operated upon in said first mentioned means and presenting the nail in predetermined relation to said finishing means.

3. In a nail making machine, the combination with means for forming a nail from a nail blank, comprising a die and a heading punch, of means for finishing the nail, arranged in predetermined relation to said forming means, and means for carrying a headed nail from the forming means to the finishing means and for simultaneously removing a nail from the finishing means, comprising two sets of fingers connected to move in unison and means to operate the fingers.

4. In a nail making machine, the combination with means for forming a nail from a nail blank, comprising a die and a heading punch, of means for finishing the nail, arranged in predetermined relation to said forming means, and means for carrying a headed nail from the forming means to the finishing means and for simultaneously removing a nail from the finishing means, comprising two sets of fingers connected to move in unison and means to open and close the fingers and to give the same both lateral and vertical movements.

5. In a nail making machine, the combination of a forming die and a trimming die, means to present a nail blank to the forming die, a heading punch coöperating with the forming die to form a headed nail, a trimming punch coöperating with the trimming die to trim the nail head, a pivoted lever carrying the heading punch and connected to operate the trimming punch, and a unitary means acting to carry a nail from the forming die to the trimming die and simultaneously to remove a nail from the trimming die.

6. In a nail making machine, the combination with mechanism for forming a nail from a nail blank, comprising a forming die, a heading punch coöperating with said die to form a nail head, and a pivoted lever carrying said punch, of mechanism for trimming the nail head, comprising a trimming die and a trimming punch coöperating with said die and operated by said lever, and means for varying the time in the movement of the lever when the trimming punch is operated to trim the head.

7. In a nail making machine, the combination with mechanism for forming a nail from a nail blank, comprising a forming die, a heading punch coöperating with said die to form a nail head, and a pivoted lever carrying said punch, of mechanism for trimming the nail head, comprising a trimming die and a trimming punch coöperating with said die, and means carried by the lever for operating the trimming punch, said means including a yielding connection, whereby the trimming punch may be held in contact with the nail head during a portion of the movement of the lever before performing the trimming operation.

8. In a nail making machine, a stationary die block carrying portions of a forming die and a trimming die, a block carrying complementary portions of the respective dies and pivotally mounted for oscillatory movement, means for oscillating said movable die block, means to present a nail blank to the forming die, a heading punch coöperating with the forming die to form a head upon the nail blank, means to carry the headed nail to the trimming die, a trimming punch coöperating with the trimming die to trim the nail head, a lever carrying the heading punch, and means carried by said lever for operating the trimming punch.

9. In a nail making machine, the combination of a forming die and a trimming die, means to present a nail blank to the forming die, a heading punch coöperating with the forming die to form a headed nail, a trimming punch coöperating with the trimming die to trim the nail head, a punch block bearing a fixed relation to the trimming die, through which the trimming punch slides, a pivoted lever carrying the heading punch, and means carried by the lever for operating the trimming punch.

10. In a nail making machine, the combination of a forming die and a trimming die, means to present a nail blank to the forming die, a heading punch coöperating with the forming die to form a headed nail, a trimming punch coöperating with the trimming die to trim the nail head, a punch block bearing a fixed relation to the trimming die, through which the trimming punch slides, a pivoted lever carrying the heading punch, and means carried by the lever for operating the trimming punch, said means including a yielding connection, whereby the trimming punch may be held in contact with the nail head during a portion of the movement of the lever before performing the trimming operation.

11. In a nail making machine, a stationary die block carrying portions of a forming die and a trimming die, a movable die block carrying complementary portions of the respective dies, means to present a nail blank to the forming die, a heading punch coöperating with the forming die to form a head upon the blank, means to carry the headed nail from the forming die to the trimming die, a punch block rigid with the stationary die block, a trimming punch movable in said punch block and coöperating with the trimming die to trim the nail head, and means to operate the heading and trimming punches.

12. In a nail making machine, a stationary die block carrying portions of a forming die and a trimming die, a movable die block carrying complementary portions of the respective dies, means to present a nail blank to the forming die, a heading punch coöperating with the forming die to form a head upon the blank, means to carry the headed nail from the forming die to the trimming die, a punch block rigid with the stationary die block, a trimming punch movable in said punch block and coöperating with the trimming die to trim the nail head, a lever carrying the heading punch, and means carried by the lever for operating the trimming punch.

13. In a nail making machine, a stationary die block carrying portions of a forming die and a trimming die, a movable die block carrying complementary portions of the respective dies, means to present a nail blank to the forming die, a heading punch coöperating with the forming die to form a head upon the blank, means to carry the headed nail from the forming die to the trimming die, a punch block rigid with the stationary die block, a trimming punch movable in said punch block and coöperating with the trimming die to trim the nail head, a lever carrying the heading punch, and means carried by the lever for operating the trimming punch, said means including a yielding connection whereby the trimming punch may be held in contact with the nail head during a portion of the movement of the lever before performing the trimming operation.

14. In a nail making machine, the combination with means for forming a nail from a nail blank, comprising a two part die and a heading punch, of means constructed to operate upon the sides of the nail head for finishing the nail so formed, said finishing means being arranged in predetermined relation to said forming means and comprising also a two part die, and means for grasping the shank of the nail formed in said first mentioned means and presenting said nail in predetermined relation to said finishing means.

15. In a nail making machine, the combination with means for forming a head upon a nail blank and for shaping the shank of the nail adjacent to the head, comprising a two part die and a heading punch, of finishing means comprising a die constructed to operate upon the sides of the nail head to remove irregularities incident to the heading operation, said finishing means being arranged in predetermined relation to said forming means, and means for grasping a portion of the shank that has not been operated upon in said first mentioned means and presenting the nail in predetermined relation to said finishing means.

In testimony whereof I have signed my name to this specification in the presence of two subscribing witnesses.

JOHN HYSLOP.

Witnesses:
  JAMES R. HODDER,
  BERNARD BARROWS.

---

Copies of this patent may be obtained for five cents each, by addressing the "Commissioner of Patents, Washington, D. C."

Corrections in Letters Patent No.1,072,465.

It is hereby certified that in Letters Patent No. 1,072,465, granted September 9, 1913, upon the application of John Hyslop, of Abington, Massachusetts, for an improvement in "Nail-Making Machines," errors appear in the printed specification requiring correction as follows: Page 1, line 104, before the word "dropped" insert the word *and;* same page and line, before the article "the" strike out the word "and;" and that the said Letters Patent should be read with these corrections therein that the same may conform to the record of the case in the Patent Office.

Signed and sealed this 9th day of December, A. D., 1913.

[SEAL.]

J. T. NEWTON,
*Acting Commissioner of Patents.*